(12) United States Patent
Backer et al.

(10) Patent No.: US 7,133,734 B2
(45) Date of Patent: Nov. 7, 2006

(54) METHOD FOR CREATING A SCULPTURE

(76) Inventors: Richard Backer, 20 Airstrip Rd., East Stroudsburg, PA (US) 18301; Daniel Backer, 20 Airstrip Rd., East Stroudsburg, PA (US) 18301

( * ) Notice: Subject to any disclaimer, the term of this patent is extended or adjusted under 35 U.S.C. 154(b) by 0 days.

(21) Appl. No.: 10/251,463

(22) Filed: Sep. 20, 2002

(65) Prior Publication Data

US 2004/0059454 A1 Mar. 25, 2004

(51) Int. Cl.
*G06F 19/00* (2006.01)
*G05B 19/42* (2006.01)
*B44F 7/00* (2006.01)
*G06K 9/03* (2006.01)

(52) U.S. Cl. ................ 700/98; 700/89; 700/118; 700/160; 700/180; 428/15; 428/913.3; 382/108; 382/113; 382/311

(58) Field of Classification Search ............... 700/98, 700/118, 146, 182, 56, 89, 160, 180, 186; 345/603, 619; 347/129; 434/82; 717/142; 364/468.03; 365/119; 428/15, 913.3; 382/108, 382/112, 113, 254, 258, 274, 266–269, 276, 382/309, 311
See application file for complete search history.

(56) References Cited

U.S. PATENT DOCUMENTS

| | | | |
|---|---|---|---|
| 3,932,923 A | | 1/1976 | DiMatteo |
| 4,190,221 A | | 2/1980 | Updike |
| 4,238,840 A | * | 12/1980 | Swainson ............ 365/119 |
| 4,520,064 A | * | 5/1985 | Kanzelberger ......... 428/199 |
| 4,739,487 A | | 4/1988 | Bonnet et al. |
| 4,972,323 A | * | 11/1990 | Cauwet ............... 700/187 |
| 5,012,069 A | | 4/1991 | Arai |
| 5,197,013 A | | 3/1993 | Dundorf |

(Continued)

OTHER PUBLICATIONS

Toronto Culture, "City of Toronto Art Walk", Toronto International Art Fair, 1999.*

(Continued)

*Primary Examiner*—Leo Picard
*Assistant Examiner*—Sean Shechtman
(74) *Attorney, Agent, or Firm*—Stephen E. Feldman PC

(57) ABSTRACT

A method for sculpting art including preparing an artistic line drawing of interconnected lines having varying widths. The artistic line drawing is converted to a format suitable for computer numeric controls for guiding cutting means. The sculpture is cut out of a piece of material using cutting means suitable for defining holes around the artistic line drawing. The sculpture and mounting means are finished. The mounting means provides a mechanism for spacing the sculpture from and attaching the sculpture to a structure. The mounting means are substantially invisible to a viewer when positioned on the structure. The sculpture having a combination of varying weight lines which appear to be drawn by a felt tipped pen.

17 Claims, 5 Drawing Sheets

U.S. PATENT DOCUMENTS

| | | | |
|---|---|---|---|
| 5,568,391 A * | 10/1996 | Mckee | 700/122 |
| 5,584,016 A * | 12/1996 | Varghese et al. | 700/97 |
| 5,632,913 A | 5/1997 | Mori | |
| 5,701,251 A | 12/1997 | Yoshimura | |
| 5,722,209 A * | 3/1998 | Delaney et al. | 52/455 |
| 5,771,310 A * | 6/1998 | Vannah | 382/154 |
| 5,872,714 A | 2/1999 | Shaikh et al. | |
| 5,926,388 A * | 7/1999 | Kimbrough et al. | 700/118 |
| 6,132,821 A * | 10/2000 | Garr | 428/15 |
| 6,271,856 B1 * | 8/2001 | Krishnamurthy | 345/581 |
| 6,330,523 B1 * | 12/2001 | Kacyra et al. | 702/159 |
| 6,602,578 B1 * | 8/2003 | Tompkin et al. | 428/156 |
| 6,766,216 B1 * | 7/2004 | Erichsen et al. | 700/160 |
| 2001/0025459 A1 * | 10/2001 | Barnes | 52/103 |
| 2002/0046576 A1 | 4/2002 | Campbell | |
| 2002/0092389 A1 | 7/2002 | Feldman et al. | |
| 2002/0095236 A1 * | 7/2002 | Dundorf | 700/182 |
| 2003/0065424 A1 * | 4/2003 | Erichsen et al. | 700/281 |

OTHER PUBLICATIONS http://www.metal-minds.com, "Bubbles", Internet Archive, WayBackMachine, May 18, 2001.* http://www.rapidcreekcutters.com, Internet Archive, WayBackMachine, Aug. 6, 2002.*

* cited by examiner

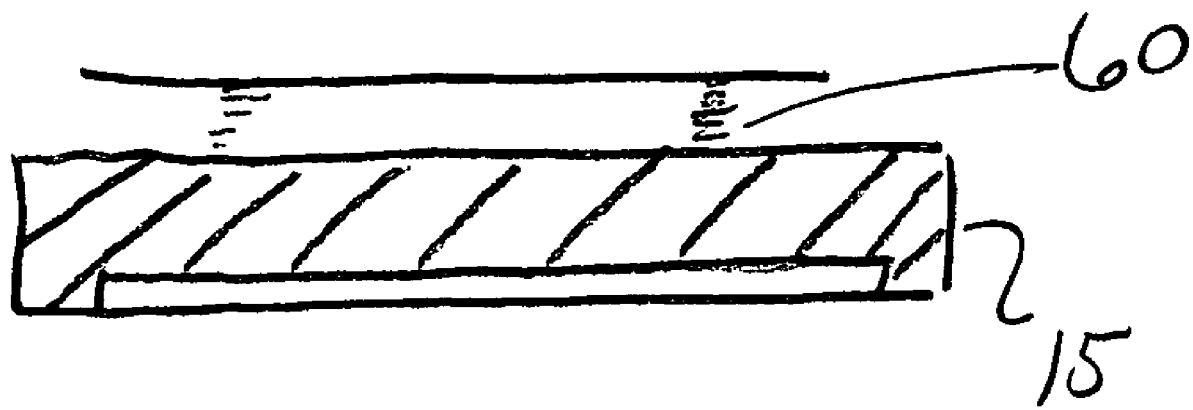

METHOD FOR CREATING A SCULPTURE

BACKGROUND

1. Technical Field

The present disclosure relates to methods for creating sculptures. More particularly, the present disclosure relates to methods for creating sculptures using devices being directed by computer numeric controls and the sculptures themselves.

2. Background of Related Art

Traditional sculptures fabricated by hand require great skill and large quantities of time to produce a work of art. Modern sculpturing processes have benefited from the reliability and accuracy provided by current industrial processes which can greatly reduce the time required to produce a similar work of art. Sculptures can now be shaped using computer numeric controls to cut, etch or carve precision forms in materials such as glass, wood composites, stone, plastic, and metal. Technological improvements patented in this area range from increasing the automation of the processes for cutting materials to cutting three dimensional signs of wood.

In U.S. Pat. No. 5,584,016 to Varghese et al., an improved cutting device control system is described. The improved control system analyzes drawings and uses devices such as algorithms and constraints in the software program to create lower level computer instructions to fully automate the cutting process, Specific steps in the process include (a) loading a pattern from a known format into a computer memory location, wherein the pattern includes one or more draw primitives; (b) applying a set of predetermined rules to the draw primitives to determine a cutting path along the one or more draw primitives without operator intervention; and (c) determining cutting instruction from the cutting path. Varghese et al. however, is limited by its focus on automating a cutting process and fails to address a creative process for manually tailoring the artistic drawing in the computer to ensure the artistic intent for the piece to touch and flow smoothly is adequately represented by the computerized image.

In U.S. Pat. No. 5,701,251 to Yoshimura, a blank cutting process is described using sequential and continuous high speed cutting around the perimeter of adjacently positioned blanks. This advantageously reduces the cost of mass producing blanks. Yoshimura, however, is limited in the effectiveness of its application to specific angular optimal blank geometries. Thus, the methods of Yoshimura cannot be readily applied to artistic creations having irregular lines that frequently have defined unconnected ends.

A method for rapidly producing a contoured part is taught in U.S. Pat. No. 5,872,714 to Shaikh et al., wherein (a) a computer graphic representation of a part is produced; (b) sectioning the graphic model into graphic members configured as blocks or slabs; (c) carving a solid member for each graphic member that is proportional to and envelopes the graphic member by carving out two or more sides of the solid graphic members to duplicate the corresponding graphic member; and (d) securing the carved solid members together to replicate the graphic model as a usable unitary part. This multiple step process produces a mold suitable for casting complex part configurations. Shaikh et al., however, is overly complex and the process focuses on reproducing three dimensional parts and it is not conducive to replicating ornate sculptures of artistically line drawings having interrelated arcuate and straight lines.

In U.S. patent application No. 2002/0092389A1 to Feldman et al. a method is described for accurately cutting pieces from a closely packed marker containing tangency points and common lines so as to minimize cutting time and the use of the raw material. Feldman et al. is limited, however, by its focus on automating a cutting process and fails to address a creative process for manually tailoring the artistic drawing in the computer to ensure the artistic intent for the piece to touch and flow smoothly is adequately represented in a computerized image.

In U.S. patent application No. 2002/0095236A1 to Dundorf, methods and apparatus are disclosed for carving signs having three dimensional surfaces. Dundorf uses a computer-aided design system to produce a three dimensional graphic model of the signage work having three-dimensional surfaces to be carved in a sign board. Material is removed using a carving tool under the computer-aided machining system to leave a three dimensional carved pattern corresponding to the three dimensional model of the signage work having surface properties and features characteristic of a hand-crafted gold-leafed wood carved signs. Dundorf however, does not teach a process suitable for taking an artistic line drawing and transitioning the line drawing to a computer aided drawing, using the computer ensure the touch and flow of the artistic intent for the piece is smoothly and adequately repesented in the computerized image, and defining the artistic line in the medium by cutting through holes around the artistic lines.

A continuing need exists for a method for creating a sculpture of an artistic line drawing using computer numeric controlled cutting devices to shape the sculpture.

SUMMARY

A process for sculpting an artistic line drawing is describe including creating an artistic line drawing having a plurality of lines. The lines have artistically varying length and width. Each line is in direct contact with at least one other line. The artistic line drawing is converted to a computer format suitable for computer numeric controlled cutting of the artistic line drawing from a material. Cutting means driven by computer numeric controls is used to cut through and define holes in the material around the artistic lines to define the sculpture. The sculpture has a front side and a back side. The surface of the sculpture is finished to create an optical effect having the appearance of drawn lines such as those unevenly drawn by a felt tipped pen.

The invention, together with attendant advantages, will be best understood by reference to the following detailed description of the invention when used in conjunction with the figures below.

BRIEF DESCRIPTION OF THE DRAWINGS

Preferred embodiments of the presently disclosed method for creating a sculpture is described herein with reference to the drawings, wherein:

FIG. 5 is a cross sectional view of the sculpture fabricated using the method of FIG. 1, as mounted to a wall.

DETAILED DESCRIPTION OF THE EMBODIMENTS

Figure 1:
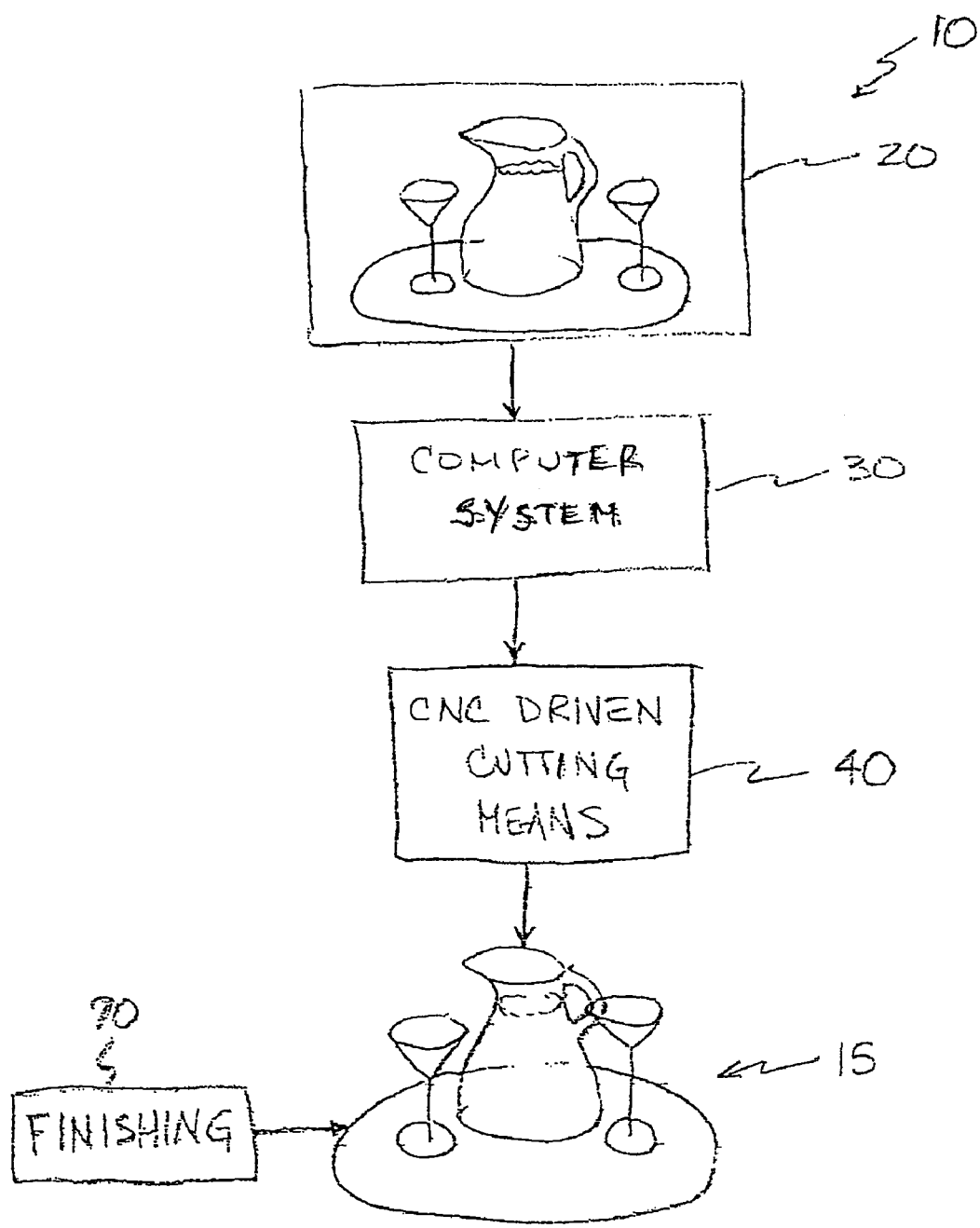
FIG. 1 is a simplified schematic diagram of a first embodiment of a method for creating a sculpture in accordance with the present disclosure.

Referring now in specific detail to the drawings in which like referenced numerals identify similar or identical elements throughout the several views, and initially to FIG. 1, a novel method for creating a sculpture or a sculpting system 10 is shown including creating a line drawing 20, using a computer system 30 to convert the line drawing into a computerized image, and using cutting means 40 to cut a sculpture 15, and finishing 70 the surface of sculpture 15.

Figure 2:
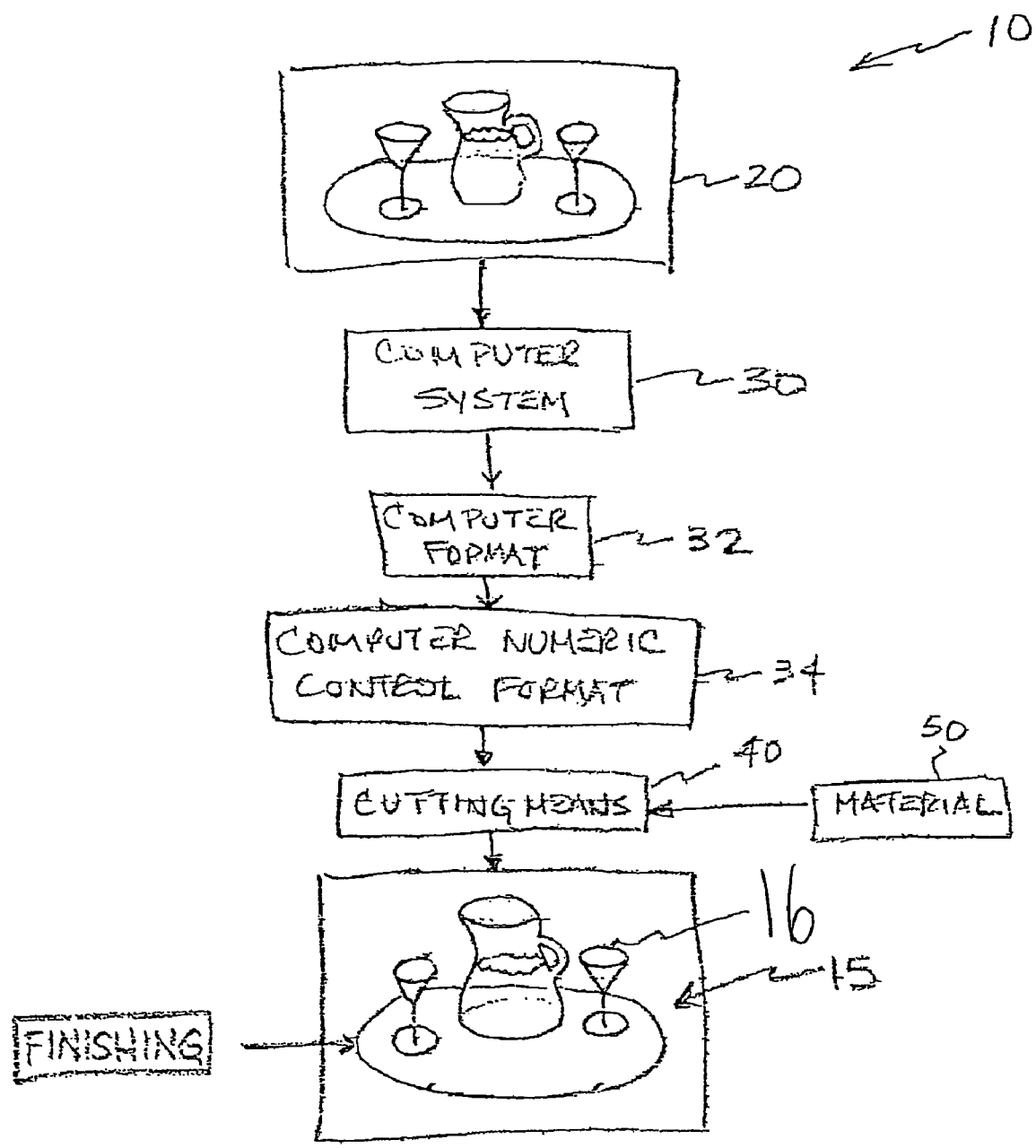
FIG. 2 is an expanded schematic diagram of the first embodiment of the method for creating a sculpture in accordance with the present disclosure.

Referring now to FIGS. 1 and 2, an artist creates line drawing 20 on paper using a medium such as a pencil, charcoal, ink, felt tipped pen, or marker suitable for creating lines having varying weights. The varying weight or width of the lines is used to artistically show depth in a two dimensional representation of three dimensional space, shading, the relative fineness of a particular object relative to other objects, or creative expression, for example. Each line of drawing 20 is connected to at least one other line of drawing 20. Drawing 20 preferably has a single color, but drawing 20 can be made in any color or combinations of colors.

A scanner of computer system 30 is used to convert line drawing 20 into a computer image in a standardized computer file format 32 suitable for defining the lines and arcs of the drawing in a two-dimensional or three-dimensional coordinate system. The standardized file format 32 produced by a computer aided design software program can include a DXF type file, for example, suitable for conversion to a computer numeric control format 34.

Alternatively, the artistic line drawing 20 is created on a computer system 30 using software suitable for artistic expressions in the form of line drawings 20. The file format of the computer based drawing 20 is converted either directly to the standardized file format 32 and then to computer numeric control format 34 or directly to the numeric control format 34. Any conversion process is accompanied by a review and evaluation of the image/or initial developmental aristic model by the artist to ensure the artistic quality has not been degraded by the conversion process. Degradation of the conversion process can create undesirable effects, such as rough edges, on the lines that will be converted with the desirable attributes of the artistic lines and then again undesirably replicated through the computer numeric controlled cutting means 40.

For example, once the paper based artistic line drawing 20 is converted to standardized file format 32, the computer generated line drawing is reviewed and evaluated by the artist to ensure that the artistic integrity of drawing 20 is adequately represented by the computer generated version. The artist ensures the computer depicted lines all have at least one point in common with another line. Further, the artistic feel of the lines is verified by the artist to ensure the weight and flow of the computer image of the drawn lines is consistent with the artist's intent. Any roughness in the edges of the lines is also smoothed out by the artist and additional artistic creation can take place. The result is a computerized artist's drawing 20 having flowing lines of variable weight such as that of a marker or felt tipped pen.

Computer numeric control format 34 is used to direct cutting means 40. In a first preferred embodiment, cutting means 40 is a waterjet device suitable for cutting a steel plate material 50 approximately one eighth or 0.125 of an inch in thickness. While it is preferred material 50 is a single solid unitary piece, material 50 can include different materials or have more than one piece integrated together. Sculpture 15 can be fabricated using materials 50 having a wide range of widths from thousandths of an inch to approximately 18 inches as long as suitable structural integrity for sculpture 15 is provided by material 50.

Cutting means 40 also encompasses devices suitable for cutting sculpture 15 from natural and/or man made materials such as any type of metal, metal alloys, wood, plastic, composites, or stone such that sculpture 15 retains sufficient rigidity to sustain its shape when mounted on a structure. Cutting means 40 includes devices such as, but not limited to laser, plasma, ultrasound, hot-wire, band saw, and waterjet suitable for cutting the desired material.

After sculpture 15 has been sculpted using cutting means 40, sculpture 15 is dried prior to finishing 70. Sculpture 15, including mounting means 60 as appropriate, undergoes surface treatment or finishing 70 using a belt sander or a similar treatment device or mechanism to smooth rough edges from the cut and prepare the outer surface for treatment. Finishing 70 can include a simple buffing and/or applying a sealant or paint. Painting processes such as a powder coating type paints that resist chipping are preferred. In one preferred embodiment, the entire sculpture surface is finished including a front side, a reverse side, and means for mounting 60.

Figure 4:
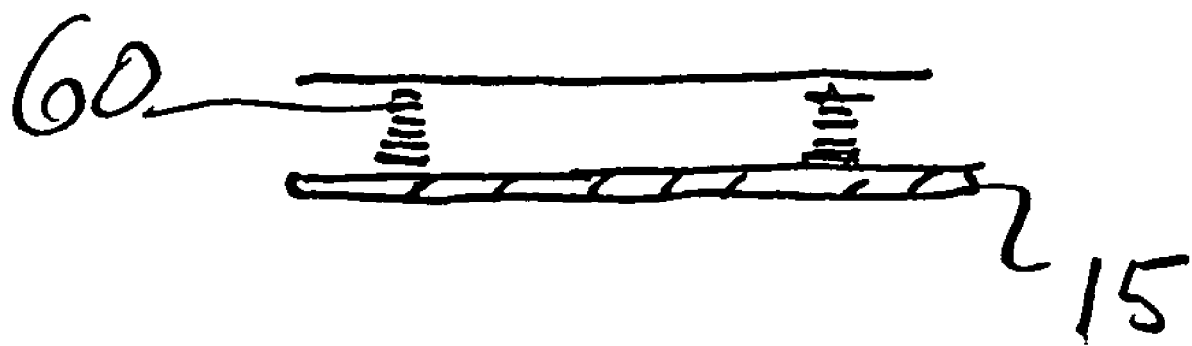
FIG. 4 is s side view of the invention as mounted to a wall.

Shown in FIGS. 4 and 5. means for mounting 60 preferably includes positioning a stud on the reverse side of sculpture 15. The stud is preferably attached using a stud welder type device, but it can be any type of bonding mechanism to include adhesives that are not readily visible from the front of sculpture. The stud is then connected to a spacer for securely positioning sculpture 15 to a structure and, as desired, to provide a stand off from the structure for the sculpture. Mounting means 60 preferably positions the face of sculpture 15 approximately 1and/1;2 inch from the structure. Mounting means 60 includes a washer on the end of the spacer for connecting to structure. The spacer and stud are configured to be substantially concealed when sculpture 15 is positioned on the structure. Sculpture 15 is configured such that it can be mounted in any relationship to the structure. Mounting means 60 support function can include alternative supporting mechanisms such as a wire, vertical suspension using a clear thin plastic line, or a piece of plastic that is not readily visible from the front of sculpture.

Figure 3:
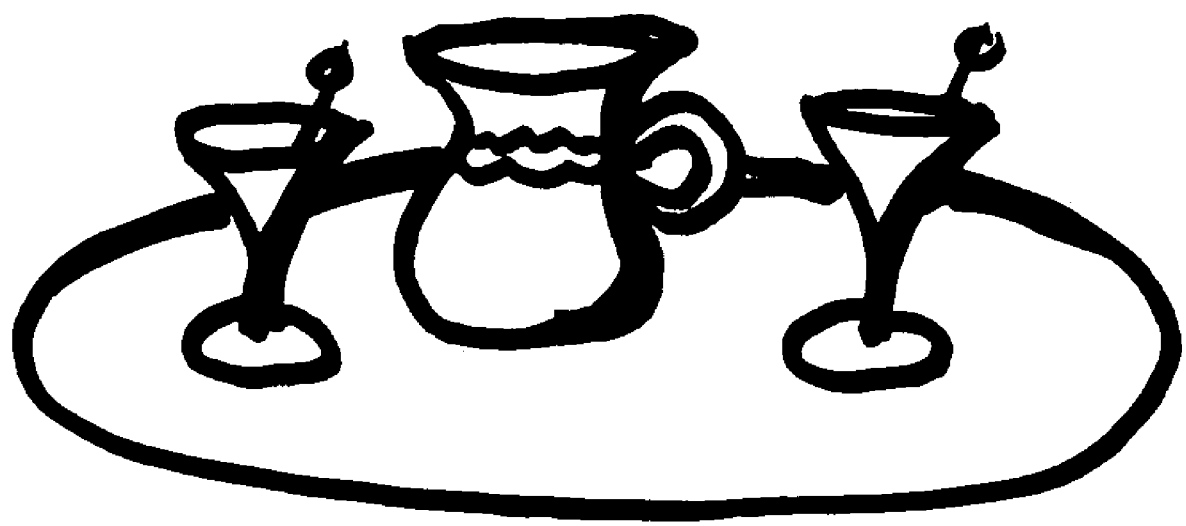
FIG. 3 is frontal perspective view of one sculpture fabricated using the method of FIG 1.

Referring now to FIG. 3, the configuration of sculpture 15 including the varying width of the artistic lines, the relative flatness of the sculpture, positioning of the sculpture a finite distance from the wall, and a generally contrasting color, preferably black, to that of a background structure has an optical effect of appearing as if it is uneven felt tipped line drawing marked directly on the structure of a wall when viewed from a first perspective that is generally perpendicular to the face of the sculpture. This visual effect is particularly noted when the mounting means positions the face of the sculpture approximately one and a half inches from the structure using mounting means 60 and has the function of making the sculpture appear as a graffiti type drawing made by a marker. The visual effect is eye catching to viewers and attracts their interest because it appears to be hand drawn uneven lines drawn with a felt tipped pen.

Alternately, the configuration of sculpture 15 including the varying width of the artistic lines, the relative flatness of the sculpture, the positioning a finite distance from the wall, and a generally contrasting color, preferably black, to that of a background structure has demonstrated an unexpected optical effect of appearing as if it is a free floating artistic line drawing marked in the air when viewed from a second perspective that is generally not perpendicular to the face of the sculpture. This additional unexpected visual effect functions similarly when the sculpture is positioned approximately one and a half inches from the structure by mounting means to make the sculpture appear as a marker type drawing positioned in mid air. The visual effect, again, is eye catching to viewers and attracts their interest.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure.

What is claimed is:

1. A method for creating a sculpture comprising the steps of:
   a. creating a two-dimensional line drawing on a first medium, said line drawing being created through the use of a drawing instrument, said line drawing having varying line widths, the varying line widths being used to artistically show depth of the two-dimensional line drawing in a three dimensional format, the format including space, shading and a fineness of a particular line to other lines;
   b. scanning the line drawing into a computer system;
   c. converting the line drawing into a computerized image using the computer system;
   d. displaying the computerized image on a display means;
   e. reviewing, evaluating and editing the computerized image to ensure the artistic quality of the two-dimensional line drawing is adequately represented by the computer image;
   f. converting the computerized image into a computer numeric control format;
   g. cutting the computerized image into a second medium using the computer numeric control format, said second medium being flat, said second medium having a facing surface and a reverse side;
   h. drying the second medium;
   i. applying a color to the image cut into the second medium;
   j. finishing the facing surface of the second medium;
   k. positioning a stud on the reverse side of the second medium;
   l. connecting a spacer to the stud, said spacer having a distal end;
   m. positioning a washer on the distal end of the spacer;
   n. positioning the second medium on a wall; and
   o. mounting the second medium a finite distance from the wall via the stud, spacer
   and washer, the stud, spacer and washer being concealed when the second medium is positioned on the wall, the finite distance being about 1 and ½ inches,
   p. whereby said method creates a first optical effect, the first optical effect is that the image cut into the second medium is drawn directly on the wall.

2. The method for creating a sculpture as claimed in claim 1 wherein the color applied to the image is black.

3. The method for creating a sculpture as claimed in claim 1 wherein the drawing instrument is a pencil, charcoal, ink, a felt tipped pen or marker.

4. The method for creating a sculpture as claimed in claim 1 wherein each line of the drawing is connected to another line of the drawing.

5. The method for creating a sculpture as claimed in claim 1 wherein the computerized image is a standardized format.

6. The method for creating a sculpture as claimed in claim 5 wherein the standardized format is a DXF-type file.

7. The method for creating a sculpture as claimed in claim 4 wherein the step of reviewing, evaluating and editing includes ensuring the computer image has all the lines being connected to another line.

8. The method for creating a sculpture as claimed in claim 1 wherein the step of reviewing, evaluating and editing includes that a weight and flow of the lines is consistent with the line drawing.

9. The method for creating a sculpture as claimed in claim 1 wherein the step of reviewing, evaluating and editing includes ensuring that any roughness of the lines is smoothed.

10. The method for creating a sculpture as claimed in claim 1 wherein the step of cutting is performed by a waterjet device.

11. The method for creating a sculpture as claimed in claim 1 wherein the second medium is a single solid unitary piece.

12. The method for creating a sculpture as claimed in claim 1 wherein the second medium is more than one material integrated together.

13. The method for creating a sculpture as claimed in claim 1 wherein the step of finishing is performed by belt sander.

14. The method for creating a sculpture as claimed in claim 1 wherein the step of finishing includes applying a sealant to the facing surface.

15. The method for creating a sculpture as claimed in claim 1 wherein a second optical effect is that the cut image is free floating in the air.

16. An apparatus for making a sculpture comprising:
   a. creating means for creating a two-dimensional line drawing on a first medium, said line drawing being created through the use of a drawing instrument, said line drawing having varying line widths, the varying line widths being used to artistically show depth of the two-dimensional line drawing in a three dimensional format, the format including space, shading and a fineness of a particular line to other lines;
   b. scanning means for scanning the line drawing into a computer system;
   c. first converting means for converting the line drawing into a computerized image using the computer system;
   d. displaying means for displaying the computerized image on a display means;
   e. reviewing, evaluating and editing means for reviewing, evaluating and editing the computerized image to ensure the artistic quality of the two-dimensional line drawing is adequately represented by the computer image;
   f. second converting means for converting the computerized image into a computer numeric control format;
   g. cutting means for cutting the computerized image into a second medium using the computer numeric control format, said second medium being flat, said second medium having a facing surface and a reverse side;
   h. drying means for drying the second medium;
   i. applying means for applying a color to the image cut into the second medium;
   j. finishing means for finishing the facing surface of the second medium;
   k. first positioning means for positioning a stud on the reverse side of the second medium;

l. connecting means for connecting a spacer to the stud, said spacer having a distal end;

m. second positioning means for positioning a washer on the distal end of the spacer;

n. third positioning means for positioning the second medium on a wall; and o. mounting means for mounting the second medium a finite distance from the the wall via the stud, spacer and washer, the stud, spacer and washer being concealed when the second medium is positioned on the wall, the finite distance being about 1 and ½ inches, p. whereby said method creates a first optical effect, the first optical effect being that the image cut into the second medium is drawn directly on the wall.

17. The apparatus as claimed in claim 16 wherein a second optical effect is that the cut image is free floating in the air.

* * * * *